(12) United States Patent
Kim

(10) Patent No.: US 10,796,132 B2
(45) Date of Patent: Oct. 6, 2020

(54) PUBLIC SERVICE SYSTEM AND METHOD USING AUTONOMOUS SMART CAR

(71) Applicant: HANCOM, INC., Seongnam-si, Gyeonggi-do (KR)

(72) Inventor: Sang Cheol Kim, Namyangju-si (KR)

(73) Assignee: HANCOM, INC., Seongnam-si, Gyeonggi-do (KR)

( * ) Notice: Subject to any disclaimer, the term of this patent is extended or adjusted under 35 U.S.C. 154(b) by 167 days.

(21) Appl. No.: 15/748,654

(22) PCT Filed: Jul. 22, 2016

(86) PCT No.: PCT/KR2016/008054
§ 371 (c)(1),
(2) Date: Jan. 30, 2018

(87) PCT Pub. No.: WO2017/018744
PCT Pub. Date: Feb. 2, 2017

(65) Prior Publication Data
US 2019/0005310 A1    Jan. 3, 2019

(30) Foreign Application Priority Data
Jul. 30, 2015 (KR) .................. 10-2015-0108296

(51) Int. Cl.
*G06K 9/00* (2006.01)
*G08B 13/196* (2006.01)
(Continued)

(52) U.S. Cl.
CPC ....... *G06K 9/00288* (2013.01); *G05D 1/0088* (2013.01); *G06K 9/00791* (2013.01);
(Continued)

(58) Field of Classification Search
CPC ........... G06K 9/00288; G06K 9/00791; G06K 9/00832; G05D 1/0088; G05D 2201/0213;
(Continued)

(56) References Cited

U.S. PATENT DOCUMENTS 6,321,147 B1    11/2001   Takeda et al.
7,961,906 B2 *   6/2011   Ruedin ............... G06K 9/6289
                                                    382/103
(Continued)

FOREIGN PATENT DOCUMENTS

JP     2000-330636 A    11/2000
KR     10-0559379 B1     3/2006
(Continued)

OTHER PUBLICATIONS

Chung, K. H., "Apparatus for trace of wanted criminal and missing person using image recognition and method thereof," Machine Translation of Korean Patent Publication KR20130106640 (A), Sep. 30, 2013.*
(Continued)

*Primary Examiner* — Xumei G Chen
(74) *Attorney, Agent, or Firm* — Revolution IP, PLLC

(57) ABSTRACT

The present invention relates to a system and method for providing a public service using an autonomous smart car, wherein the apparatus and method are able to perform a public service using an autonomous smart car, and the system includes autonomous smart cars and an autonomous smart car managing server managing the autonomous smart cars.

7 Claims, 3 Drawing Sheets

(51) Int. Cl.
- *H04N 7/18* (2006.01)
- *G07C 5/08* (2006.01)
- *G05D 1/00* (2006.01)
- *G07C 5/00* (2006.01)

(52) U.S. Cl.
CPC ......... *G07C 5/0866* (2013.01); *G08B 13/196* (2013.01); *G08B 13/19608* (2013.01); *H04N 7/181* (2013.01); *G05D 2201/0213* (2013.01); *G06K 9/00832* (2013.01); *G07C 5/008* (2013.01)

(58) Field of Classification Search
CPC ........ G05D 1/02; G07C 5/008; G07C 5/0866; H04N 7/181; G08B 13/196; G08B 13/19608
See application file for complete search history.

(56) References Cited

U.S. PATENT DOCUMENTS

| | | | |
|---|---|---|---|
| 8,861,842 B2* | 10/2014 | Jung | G06K 9/00805 |
| | | | 382/155 |
| 9,443,151 B2* | 9/2016 | Yoo | G06K 9/00771 |
| 9,493,157 B2* | 11/2016 | Prokhorov | B60W 30/08 |
| 9,649,979 B2* | 5/2017 | Sakai | B60Q 9/008 |
| 9,792,434 B1* | 10/2017 | Li | G06F 21/554 |
| 9,950,708 B1* | 4/2018 | Cullinane | B60W 30/095 |
| 9,958,870 B1* | 5/2018 | Graybill | B60W 50/14 |
| 10,139,824 B2* | 11/2018 | Sako | G08G 1/00 |
| 10,235,889 B2* | 3/2019 | Wei | G06K 9/00832 |
| 10,365,646 B1* | 7/2019 | Farnsworth | |
| 2010/0262367 A1* | 10/2010 | Riggins | G06Q 10/10 |
| | | | 701/533 |
| 2013/0183924 A1* | 7/2013 | Saigh | H04W 4/029 |
| | | | 455/404.2 |
| 2013/0342346 A1* | 12/2013 | Hazzani | G06K 9/00288 |
| | | | 340/539.13 |
| 2014/0263615 A1* | 9/2014 | Deangelo | G07D 7/004 |
| | | | 235/375 |
| 2014/0306799 A1* | 10/2014 | Ricci | H04W 4/12 |
| | | | 340/5.83 |
| 2015/0110344 A1* | 4/2015 | Okumura | G06K 9/00624 |
| | | | 382/103 |
| 2015/0233719 A1* | 8/2015 | Cudak | G01C 21/26 |
| | | | 701/23 |
| 2016/0179093 A1* | 6/2016 | Prokhorov | B60W 40/00 |
| | | | 701/2 |
| 2016/0214533 A1* | 7/2016 | Doyle | H04N 7/181 |
| 2017/0008490 A1* | 1/2017 | Sako | G07C 9/00571 |
| 2017/0028987 A1* | 2/2017 | Yamada | B60W 50/08 |
| 2017/0076140 A1* | 3/2017 | Waniguchi | H04N 21/41407 |
| 2018/0139485 A1* | 5/2018 | Ansari | G06F 21/32 |
| 2018/0256420 A1* | 9/2018 | Kim | B60Q 1/50 |

FOREIGN PATENT DOCUMENTS

| | | |
|---|---|---|
| KR | 10-2008-0042782 A | 5/2008 |
| KR | 10-1263894 B1 | 5/2013 |
| KR | 10-2013-0106640 A | 9/2013 |

OTHER PUBLICATIONS

International Search Report for PCT/KR2016/008054 dated Oct. 20, 2016 from Korean Intellectual Property Office.

* cited by examiner

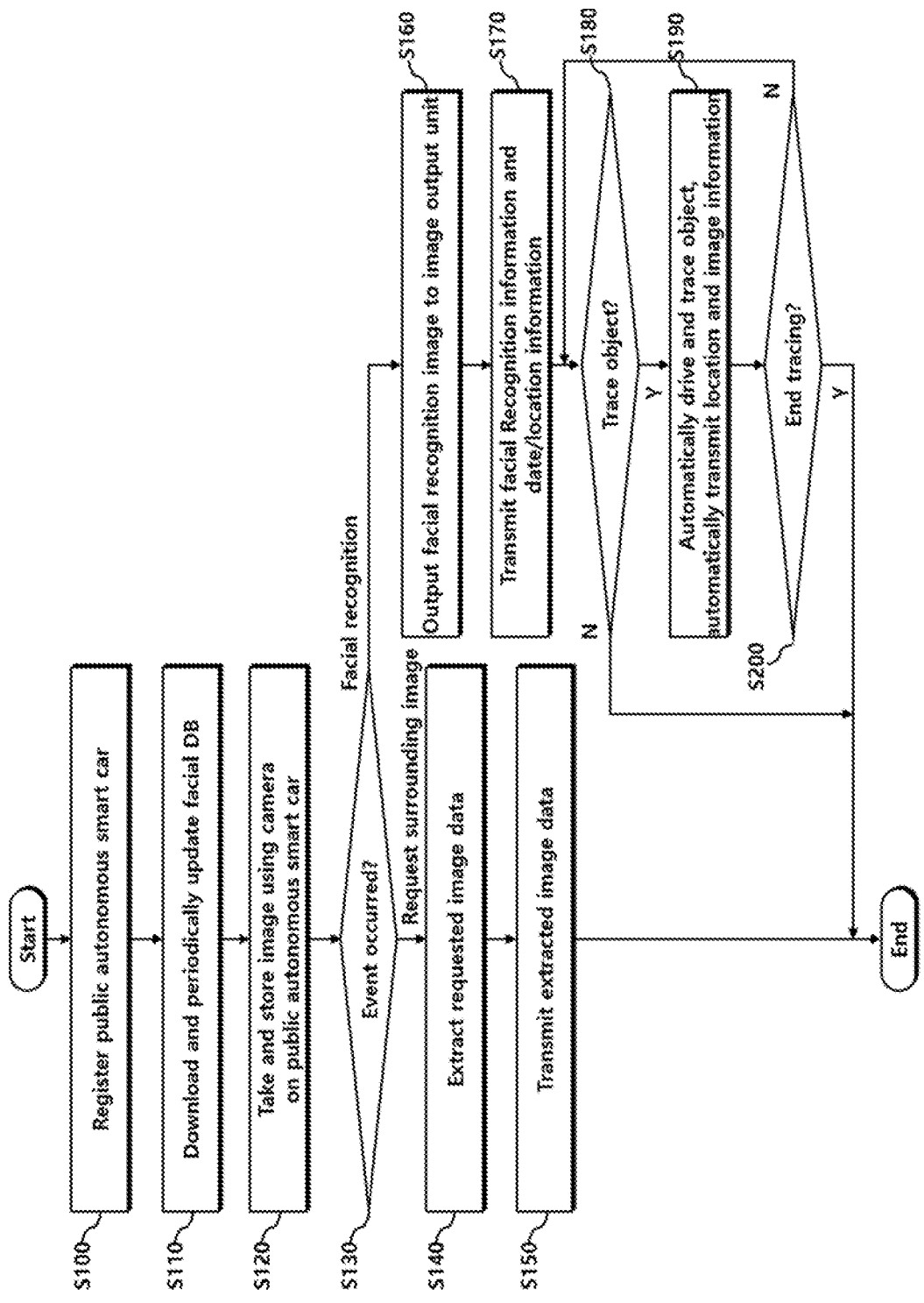

PUBLIC SERVICE SYSTEM AND METHOD USING AUTONOMOUS SMART CAR

TECHNICAL FIELD

The present invention relates to an autonomous smart car and, more particularly, to a system and method for providing a public service, using autonomous smart car.

BACKGROUND ART

Recently, research about autonomous cars is being competitively conducted with the rapid development of image processing-related technologies and the performance of sensor and hardware.

Actually, the navigation system using GPS has already been popularized as a guide service for novice drivers and the precision of the data is also being improved to have a small error range in GPS, so the reliability is being increased.

Following this tendency, recently, autonomous cars can automatically drive and even park, using cameras for showing front and rear areas, front-side radar sensors, GPS, etc.

Since such an autonomous car is in an unavoidable in the future, research about autonomous cars is being conducted in various areas, but current research in progress has usually only been about autonomous driving.

DISCLOSURE

Technical Problem

The present invention has been made in an effort to solve the problems in the art and an object of the present invention is to provide a system and method for providing a public service, using an autonomous car that can use image information, which the autonomous car can acquire when it is driving or stopped, to find missing persons or acquire image data at various accident scenes.

Technical Solution

In order to achieve the objects of the present invention, a system for providing a public service using an autonomous smart car includes: autonomous smart cars automatically driving to a destination without a driver when the destination is set, storing images that are input through cameras on the autonomous smart cars together with location information and time information, and wirelessly transmitting facial information of a matched person to the air by recognizing faces from the input or stored images on the basis of pre-stored facial information or wirelessly transmitting image data corresponding to time and location requested from a predetermined outside of input or stored data to a predetermined server; and an autonomous smart car managing server managing the autonomous smart cars, transmitting faces of missing persons or facial information of suspects or wanted persons to the autonomous smart cars, transmitting matched facial information to one or more of a public agency server and a missing person information server, which needs the facial information, depending on whether the facial information is matched with a missing person, a suspect, or a wanted person, when receiving the facial information from the autonomous smart cars, and requesting image information of a crime scene including time and location to the autonomous smart cars when the public agency server requests the image information The autonomous smart cars may include: a black box unit taking and storing images of a surrounding of the autonomous smart cars; a facial recognizing-processing unit recognizing faces of persons from the images taken by the camera; a communication unit communicating with the autonomous smart car managing server; an image output unit output various images and displaying corresponding information when a missing person, a suspect, or a wanted person is found; an autonomous driving unit autonomously driving the autonomous smart cars; and a control unit controlling the autonomous smart cars.

The black box unit may include: a first camera unit taking images of inside and outside of the cars; a first memory unit storing image data taken by the first camera unit and sound data; and a person extraction unit extracting person information from the images of the outside taken by the first camera unit.

The facial recognizing-processing unit may include: a second camera unit taking images of the outside of the cars; a facial recognition unit making data of facial information by recognizing faces of persons extracted from the black box unit or persons in the images taken by the second camera unit; a second memory unit stores facial information of one of a missing person, a suspect, and a wanted person from one of the autonomous smart car managing server, the public agency server, and the missing person information server, and updating the facial information at a predetermined period; and a facial comparison unit detecting facial information of one or more of a missing person, a suspect, and a wanted person by comparing facial recognition data recognized by the facial recognition unit with the facial information stored in the second memory unit.

The image output unit may display a face of a missing person or a suspect and a wanted person, a name of a missing person, and a name and a contact address of a guardian, or displays contact address information for recording a suspect or a wanted person.

The autonomous smart car managing server may include: a communication unit communicating with one of the autonomous smart cars, the public agency server, and the missing person information server through a communication network; a public smart car DB storing information about autonomous smart cars registered on the public service of the autonomous smart cars; a facial DB storing facial information transmitted among the autonomous smart cars, the public agency server, and the missing person information server; a public agency DB storing information about public agencies such as a police agent and a fire station and information about organizations for finding missing persons, that is, storing contact address information of police stands, police stations, and fire stations around the autonomous smart cars and telephone number information of the organizations for finding missing persons; and an autonomous smart car image DB storing images transmitted from the autonomous smart cars for date and location of each of the autonomous smart car.

When image information about a crime scene is requested, the autonomous smart car managing server may selectively request image information by referring to corresponding location information and time information to autonomous smart cars agreed with collection of time information and location information.

In order to achieve the objects of the present invention, a method of providing a public service using an autonomous smart car includes: a step of registering a public autonomous smart car; a step in which an autonomous smart car managing server managing the public autonomous smart car downloads facial information to a facial DB from a public agency server and a missing person information server, periodically updates the facial information, and transmits the facial information to the registered public autonomous smart car; a step in which the public autonomous smart cars takes images, using a camera unit in the autonomous smart car, and stores the taken image together with time information and location information; a step in which a person extraction unit of the public autonomous smart car extracts persons from the taken images, a facial recognition unit recognizes faces of the extracted persons, and a facial comparison unit compares the recognized faces with facial information stored in a memory unit; and a step in which when the public agency server or the autonomous smart car managing server requests a surrounding image to the public autonomous smart car, image data corresponding to corresponding date and time is extracted, the extracted image data is wirelessly transmitted to the public agency server or the autonomous smart car managing server, and when a matched person is detected as a result of recognizing faces in images taken by a camera of the autonomous smart car, facial recognition information and information about date, time, and location are transmitted to one or more of the autonomous smart car managing server, the public agency server, and the missing person information server.

The public autonomous smart car may be an autonomous smart car set to transmit a crime scene image when recognizing a face of one or more of a mixing person, a suspect, and a wanted person from images taken by its own black box camera or a separate camera or when receiving a rightful request for the crime scene image, of autonomous smart cars.

An image output unit may output contact address information of a guardian of a missing person together with matched information when a missing person is matched, and may output information about police stands and police stations around the autonomous smart car when a suspect is matched.

The method may further include a step in which when the autonomous smart car receives a request for tracing a facial recognition target (object) from a user of the autonomous smart car, the autonomous smart car automatically drives and traces the object and transmits location and image information to the autonomous smart car managing server, the public agency server, and the missing person information server.

Advantageous Effects

The present invention has the following effects.

First, it is possible to help find missing persons, suspects, and wanted persons by recognizing faces, using a black box camera on an autonomous smart car or a separate camera.

Second, it is possible to use image data at various accident scenes for public good by taking images around the accident scenes, using a black box camera on an autonomous smart car or a separate camera, and by transmitting the images to the outside when a police agency or a fire station requests the images.

DESCRIPTION OF DRAWINGS

FIG. 3 is a flowchart illustrating a public service method using an autonomous car according to the present invention.

BEST MODE

Exemplary embodiments of the present invention are described hereafter in detail with reference to the accompanying drawings.

Common terms that are generally used now were selected for terminologies used herein were selected, but some of them were freely selected by the applicant(s) is specific cases and the meanings were described in detail at the corresponding part in these cases, so it should be understood that the present invention should be construed on the basis of no the name of terms, but the meanings of the terms. Further, technologies well known in the art and not directly relevant to the present invention are not described in the following description of embodiments. This is for clearly communicating the subject of the present invention by omitting unnecessary description.

Figure 1:
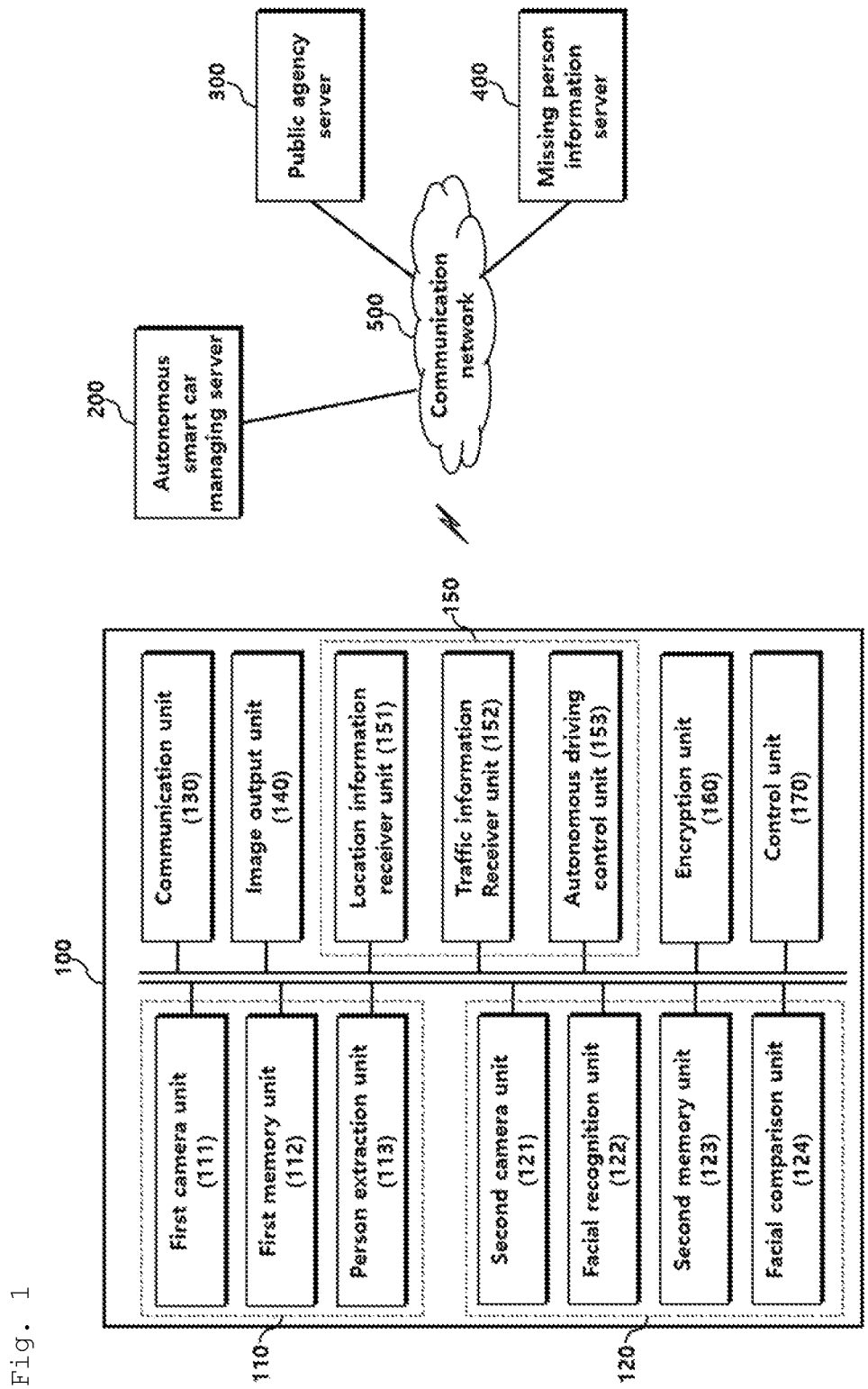
FIG. 1 is a block diagram illustrating the configuration of a system for providing a public service using an autonomous car according to the present invention.

FIG. 1 is a block diagram illustrating the configuration of a system for providing a public service using an autonomous car according to the present invention.

The system for providing a public service using an autonomous car according to the present invention, as shown in FIG. 1, includes an autonomous smart car 100, an autonomous smart car managing server 200, a public agency server 300, and a missing person information server 400.

The autonomous smart car 100 automatically drives to a destination without a driver when the destination is set, stores images that are input through cameras on the autonomous smart car 100 together with location information and weather information, recognizes faces from the input or stored images, wirelessly transmits information about corresponding face to one of receiving parts, that is, the autonomous smart car managing server 200, the public agency server 300, and missing person information server 400 when the face is that is a missing person, a suspect, or a wanted person, and wirelessly transmits image data, which has been requested by the autonomous smart car managing server 200 or the public agency server 300, of stored image data to the receiving part.

The autonomous smart car 100 includes a black box unit 110, a facial recognizing-processing unit 120, a communication unit 130, an image output unit 140, an autonomous driving unit 150, an encryption unit 160, and a control unit 170.

The black box unit 110 takes and stores images of the surrounding of the autonomous smart car 100. In general, the black box unit 110 stores images and sounds inside and outside a vehicle when the vehicle is being driven or stopped, but further has a function of extracting persons in the present invention. The black box unit 110 of the present invention includes a first camera unit 111, a first memory unit 112, and a person extraction unit 113.

The first camera unit 111 of the black box unit 110 takes images of the inside and outside of the car.

The first memory unit 112 stores images and sounds taken by the first camera unit 111.

The person extraction unit 113 extracts person information from the images of the outside of the car taken by the first camera unit 111. In order to extract the person information, it is possible to use a method of extracting persons by recognizing faces through a smartphone etc., or of detecting movement. The method of detecting movement can provide intellectual characteristics such as detecting, tracing, classifying, recognizing, and integrating movement and analyzing behaviors with the recent development of the imaging technology, image tracing is performed by a series of calculation modules, and the modules respectively perform functions of locating objects (persons and things), recognizing objects, and tracing objects. For example, an Active Shape Model (ASM)-based tracing algorithm models object shapes and matches them to combinations of information about repeatable movement and coarse-to-fine estimation using a combination with a Kalman filter provides a stronger result, and a feature-based shape tracing method called Non-Prior Training Active Feature model (NPTAFM) is provided in order to reduce load in calculation. Such feature-based object modeling can trace an object using considerably less features in comparison to existing shape-based modeling requiring the entire shape.

The facial recognizing-processing unit 120 includes a second camera unit 121, a facial recognition unit 122, a second memory unit 123, and a facial comparison unit 124.

The second camera unit 121 takes image of the outside of the car.

The facial recognition unit 122 makes facial information by recognizing the faces of persons extracted by the person extraction unit 113 of the black box unit 110 or the faces of persons from images taken by the second camera unit 121.

The second memory unit 123 stores facial information of missing persons, suspects, and wanted persons from one of the autonomous smart car managing server 200, the public agency server 300, and the missing person information server 400, and updates the information at a set period.

The facial comparison unit 124 detects missing persons, suspects, and wanted persons by comparing the facial recognition data made by the facial recognition unit 122 with the facial information stored in the second memory unit 123.

The facial recognizing-processing unit 120 is provided to take images of sidewalks for pedestrians under the assumption that the black box unit 110 takes images of the front and rear areas of the car. Obviously, when the black box unit 110 takes images of the entire surrounding of the car, there may be no need for the second camera unit 121.

The communication unit 120 performs wireless communication with one or more of the autonomous smart car managing server 200, the public agency server 300, and the missing person information server 400 outside the autonomous smart car 100.

The image output unit 140 outputs various images and displays corresponding information when a missing person, a suspect, or a wanted person is found. The image output unit can display the faces of missing persons, suspects, or wanted persons, the name of missing persons and the name and contact addresses of guardians or displays contact address information for reporting wanted persons or suspects so that a user of the autonomous smart car 100 can take the follow-up measures (for example, meeting or reporting a missing person).

The autonomous driving unit 150, which is provided for autonomously driving the autonomous smart car 100, may include a location information receiving unit 151, a traffic information receiving unit 152, and an autonomous driving control unit 153.

The location information receiving unit 151 receives the current location information of the car. For example, it receives GPS information.

The traffic information receiving unit 152 receives traffic information to the destination while the autonomous smart car 100 is driven.

The autonomous driving control unit 153, which enables the location information receiving unit 151 to receive the current location of the car and the autonomous smart car 100 to automatically drive to the destination, controls the steering system, brake system, acceleration system, transmission etc. of the car.

The encryption unit 160 decodes received facial information or encodes and transmits facial information or image information of a crime scene to be transmitted outside.

The control unit 170 controls the autonomous smart car 100 and receives facial information from the outside through the communication unit 130, or controls the communication unit 130 to transmit a face information to the outside when a matched face is recognized by the facial recognizing-processing unit 120. Further, discrimination information that is set in advance is stored to discriminate requested information in order to transmit requested information only for rightful requests. This information may be set in advance between the autonomous smart car 100 and the autonomous smart car managing server 200, the public agency server 300, and the missing person information server 400.

The autonomous smart car managing server 200 manages the autonomous smart car 100, transmits the faces of missing persons or facial information of suspects or wanted persons to the autonomous smart car 100. Further, when receiving matched facial information from the autonomous smart car 100, the autonomous smart car managing server 200 transmit the facial information to the public agency server 300 or the missing person information server 400 that needs the facial information, depending on whether the facial information is matched with a missing person, a suspect, or a wanted person. When image information of a crime scene including time and location is requested from the public agency server 300, the autonomous smart car managing server 200 requests an image with identification information set in advance to autonomous smart cars that applied for a public service of autonomous smart cars 100. To this end, there may be actually problematic factors when the autonomous smart car managing server 200 manages all autonomous smart cars, so it can request image information including time and location requested from the public agency server 300 to autonomous smart cars that applied for public service. It may be possible to request the information to all members of autonomous smart cars or may be possible to selectively request the information by referring to corresponding location and time to autonomous smart cars that agreed with collection of date and location information.

The public agency server 300 may be a server of a police agency or a fire station etc. When the public agency server 300 is the server of a police agency, the server requests images of an area where a missing person, a suspect, a wanted person, or a criminal (a hit-and-run driver, a robber, or a thief) was found, including information about the area and time, to the autonomous smart car managing server 200. When the public agency server is the server of a fire station and the reason of ignition including a fire is unclear, the server requests images of a corresponding area, including information about the area and time, to the autonomous smart car managing server 200.

The missing person information server 400 is a server storing information about missing persons to find missing persons and the mission person information may be facial information, name information, age information, contact address information about the missing person clothing colors worn when gone missing, missing place information, etc. The missing person information server 400 transmits pictures of the faces of missing persons to the autonomous smart car managing server 200.

Figure 2:
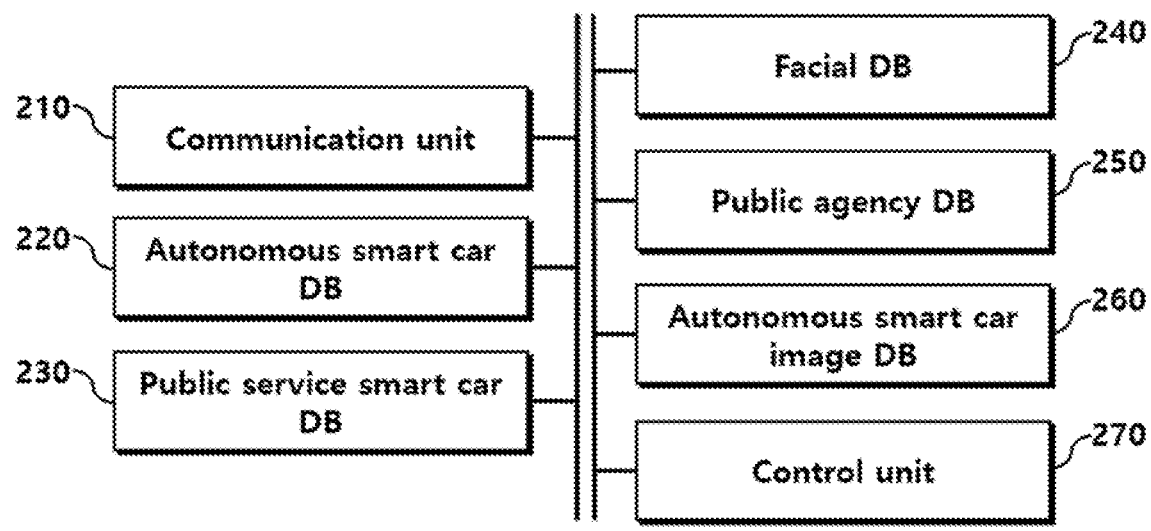
FIG. 2 is a block diagram illustrating in detail the configuration of an autonomous smart car managing server shown in FIG. 1.

FIG. 2 is a block diagram showing in detail the configuration of an autonomous smart car managing server shown in FIG. 1.

The autonomous smart car managing server 200, as shown in FIG. 2, includes a communication unit 210, an autonomous smart car DB 220, a public service smart car DB 230, a facial DB 240, a public agency DB 250, an autonomous smart car image DB 260, and a control unit 270.

The communication unit 210 communicates with the autonomous smart car 100, the public agency server 300, and the missing person information server 400 through a communication network 500. The communication network 500 is a wire/wireless communication network.

The autonomous smart car DB 220 stores user information (name, contact address, etc.) of the driver of the autonomous smart car 100 and car information (model name, manufacturing year, etc. of a car).

The public service smart car DB 230 stores information about autonomous smart cars registered on the public service of autonomous smart cars 100. As the information about autonomous smart cars registered on the public service, not only the user information (name, contact address, etc.) and car information (model name, manufacturing year, etc. of a car), but individual identification information set for autonomous smart vehicles 100 to determine whether requested information is rightful information when image data stored in the black box unit 110 or the first memory unit 112 of the facial recognition unit 120 is requested for the autonomous smart car 100 are stored. Further, the driving information of cars registered on the public service, that is, the movement path information for each time unit is stored. The movement path information for each time unit is used later to request images of a crime scene.

The facial DB 240 stores facial information that is transmitted among the autonomous smart car 100, the public agency server 300, and the missing person information server 400. Further, for a missing person, information of the name of the missing person and the name and address of a guardian may be stored together.

The public agency DB 250 stores information about public agencies such as a police agency and a fire station and the organizations that find missing persons. The information about public agency may be the contact address information of police stands, police stations, and fire stations around autonomous cars. The telephone number information of organizations that find missing persons may also be included.

The autonomous smart car image DB 260 stores the images transmitted from autonomous smart cars 100 for each car, date, and location. The images are stored in a database for a predetermined period in accordance with the sizes. The memory size of the first memory unit 112 of the black box unit 110 or the second memory 123 of the facial recognizing-processing unit 120 in an autonomous smart car is deleted in a FIFO (First In First Out) method, so images transmitted from autonomous smart cars are backed up for a predetermined time, depending on the memory sizes of autonomous smart cars.

The control unit 270 controls the autonomous smart car managing server 200.

FIG. 3 is a flowchart illustrating a public service method using an autonomous car according to the present invention.

The public service method using an autonomous car according to the present invention, as shown in FIG. 3, registers a public autonomous smart car (S100). The public autonomous smart car is an autonomous smart car that is set to transmit a crime scene image when recognizing the face of a missing person, a suspect, or a wanted person from images taken by its own black box camera 111 or a separate second camera 121 or when receiving a rightful request for the crime scene image, of autonomous smart cars that can automatically drive without a driver.

The autonomous smart car managing server 200 that manages the public autonomous smart car downloads facial information to the facial DB 240 from the public agency server 300 and the missing person information server 400, and periodically updates the facial information (S110). The autonomous smart car managing server 200 transmits facial information to the public autonomous smart car. Further, the public autonomous smart car stores the facial information in the second memory unit 124.

Then, the public autonomous smart car takes images using the first and second camera units 111 and 121 and stores the images (S120). Time information and location information are stored together with corresponding images. While images are taken, the person extraction unit 113 of the public autonomous smart car extracts persons from the images, the facial recognition unit 122 recognizes the faces of the extracted persons, and the facial comparison unit 124 compares the recognized faces with the facial information stored in the second memory 123.

The control unit 160 of the public autonomous smart car determines whether an event has occurred (S130).

The event occurs when a surrounding image is requested through the public agency server 300 or the autonomous smart car managing server 200 and a same person is detected as the result of recognizing faces from the images taken by the first and second camera units 111 and 112 of the autonomous smart car 100.

When a surrounding image is requested through public agency server 300 or the autonomous smart car managing server 200, image data corresponding to the corresponding data and time is extracted (S140). The image data may correspond to the image at the current location of the autonomous smart car 100 or a past image obtained by referring to the driving record of the autonomous smart car stored in the public service smart car DB 230 of the autonomous smart car managing server 200. Obviously, image data corresponding to the date and time requested from the public agency server exists in the autonomous smart car image DB 230 of the autonomous smart car managing server 200, the image data is not requested for the public autonomous smart car.

The autonomous smart car 100 wirelessly transmits the extracted image data to the public agency server 300 or the autonomous smart car managing server 200 that is the receiving part that requested the image data.

When the even is facial recognition by the facial recognizing-processing unit 120, facial recognition information is output to the image output unit (S160). In this case, for a missing person, the information (name, contact address, etc.) of a guardian of the missing person is output together with matched information. For a suspect, the information about police stands and police stations around the autonomous smart can may also be output.

Accordingly, if there is a user in the autonomous smart car, he/she can take follow-up measures in person. In particular, for a suspect or a wanted person, the user can report to the police etc., and for a missing person, the user can try to talk with the missing person or may contact the guardian if the missing person is a dotard or a child.

Further, facial recognition information and information of date, time, and location are transmitted to the autonomous smart car managing server 200, the public agency server 300, and the missing person information server 400.

Meanwhile, when the autonomous smart car 100 is requested to trace a facial recognition target (object) from a user of an autonomous smart car, it automatically drives and traces the object and transmits location and image information to the autonomous smart car managing server 200, the public agency server 300, and the missing person information server 400 (S190). This tracing is performed until a tracing end instruction is input (S200).

The present invention was described with reference to the accompanying drawings, but it is only an embodiment of various embodiments including the subject of the present invention on the purpose of allowing those skilled in the art to easily accomplish the present invention, and the present invention is not limited to the embodiment described above. Accordingly, the protective range of the present invention should be construed on the basis of the following claims and all technical spirits within an equivalent range through change, replacement, and modification in the range of the scope of the present invention will be included in the range of the right of the present invention. Further, some of the components shown in the drawings may be exaggerated or contracted for clear description.

INDUSTRIAL APPLICABILITY

The present invention can be used to search for missing persons, suspects, and wanted persons by recognizing faces, using a black box camera or a separate camera on an autonomous smart car and can use image data for handling accidents at various accident scenes by automatically transmitting images around the scenes taken by a black box camera or a separate camera on an autonomous smart car, when the images are requested from the outside for example a police agent or a fire house.

The invention claimed is:

1. A system for providing a public service using an autonomous smart car, the system comprising:
   autonomous smart cars
      automatically driving to a destination when the destination is set,
      storing images that are input through cameras on the autonomous smart cars together with location information and time information, and
      wirelessly transmitting facial information of a matched person to a predetermined outside by recognizing faces from the input or stored images on the basis of pre-stored facial information or wirelessly transmitting image data corresponding to time and location requested from the outside of input or stored data to a predetermined server; and
   an autonomous smart car managing server
      managing the autonomous smart cars,
      transmitting faces of missing persons or facial information of suspects or wanted persons to the autonomous smart cars,
      transmitting matched facial information to one or more of a public agency server and a missing person information server, which needs the facial information, depending on whether the facial information is matched with a missing person, a suspect, or a wanted person, when receiving the facial information from the autonomous smart cars, and
      requesting image information of a crime scene including time and location to the autonomous smart cars when the public agency server requests the image information,
   wherein upon image information about a crime scene being requested, the autonomous smart car managing server selectively requests image information by referring to corresponding location information and time information to autonomous smart cars agreed with collection of time information and location information,
   wherein each of the autonomous smart cars includes:
      a black box unit taking and storing images of a surrounding of the each of the autonomous smart cars;
      a facial recognizing-processing unit recognizing faces of persons from the images taken by a camera;
      a communication unit communicating with the autonomous smart car managing server;
      an image output unit outputting various images and displaying corresponding information when a missing person, a suspect, or a wanted person is found;
      an autonomous driving unit autonomously driving the each of the autonomous smart cars; and
      a control unit controlling the each of the autonomous smart cars,
   wherein the black box unit includes:
      a first camera taking images of inside and outside of the each of the autonomous smart cars;
      a first memory unit storing image data taken by the first camera and sound data; and
      a person extraction unit extracting person information from the images of the outside taken by the first camera,
   wherein the facial recognizing-processing unit includes:
      a second camera taking images of the outside of the each of the autonomous smart cars;
      a facial recognition unit making data of facial information by recognizing faces of persons extracted from the black box unit or persons in the images taken by the second camera;
      a second memory unit storing facial information of one of a missing person, a suspect, and a wanted person from one of the autonomous smart car managing server, the public agency server, and the missing person information server, and updated facial information that is updated at a predetermine period; and
      a facial comparison unit detecting facial information of one or more of a missing person, a suspect, and a wanted person by comparing facial recognition data recognized by the facial recognition unit with the facial information stored in the second memory unit.

2. The system of claim 1, wherein the image output unit displays a face of a missing person or a suspect or a wanted person, a name of a missing person, and a name and a contact address of a guardian, or displays contact address information for recording a suspect or a wanted person.

3. The system of claim 1, wherein the autonomous smart car managing server includes:
   a communication unit communicating with one of the autonomous smart cars, the public agency server, and the missing person information server through a communication network;
   a public smart car database storing information about the autonomous smart cars registered on the public service of the autonomous smart cars;

a facial database storing facial information transmitted among the autonomous smart cars, the public agency server, and the missing person information server;

a public agency database storing information about public agencies and information about organizations for finding missing persons, that is, storing contact address information of police stands, police stations, and fire stations around the autonomous smart cars and telephone number information of the organizations for finding missing persons; and an autonomous smart car image database storing images transmitted from the each of the autonomous smart cars for date and location.

4. A method of providing a public service using an autonomous smart car, the method comprising:

by the autonomous smart car, automatically driving to a destination when the destination is set;

by the autonomous smart car, storing images that are input through cameras on the autonomous smart car together with location information and time information;

by the autonomous smart car, wirelessly transmitting facial information of a matched person to a predetermined outside by recognizing faces from the input or stored images on the basis of pre-stored facial information or wirelessly transmitting image data corresponding to time and location requested from the outside of input or stored data to a predetermined server;

by an autonomous smart car managing server, managing autonomous smart cars;

by the autonomous smart car managing server, transmitting faces of missing persons or facial information of suspects or wanted persons to the autonomous smart cars;

by the autonomous smart car managing server, transmitting matched facial information to one or more of a public agency server and a missing person information server, which needs the facial information, depending on whether the facial information is matched with a missing person, a suspect, or a wanted person, when receiving the facial information from the autonomous smart cars; and by the autonomous smart car managing server, requesting image information of a crime scene including time and location to the autonomous smart cars when the public agency server requests the image information, wherein upon image information about a crime scene being requested, the autonomous smart car managing server selectively requests image information by referring to corresponding location information and time information to autonomous smart cars agreed with collection of time information and location information, wherein each of the autonomous smart cars includes:
a black box unit taking and storing images of a surrounding of the each of the autonomous smart cars;
a facial recognizing-processing unit recognizing faces of persons from the images taken by a camera;
a communication unit communicating with the autonomous smart car managing server;
an image output unit outputting various images and displaying corresponding information when a missing person, a suspect, or a wanted person is found;
an autonomous driving unit autonomously driving the each of the autonomous smart cars; and
a control unit controlling the each of the autonomous smart cars, wherein the black box unit includes:
a first camera taking images of inside and outside of the each of the autonomous smart cars;
a first memory unit storing image data taken by the first camera and sound data; and
a person extraction unit extracting person information from the images of the outside taken by the first camera, wherein the facial recognizing-processing unit includes:
a second camera taking images of the outside of the each of the autonomous smart cars;
a facial recognition unit making data of facial information by recognizing faces of persons extracted from the black box unit or persons in the images taken by the second camera;
a second memory unit storing facial information of one of a missing person, a suspect, and a wanted person from one of the autonomous smart car managing server, the public agency server, and the missing person information server, and updated facial information that is updated at a predetermine period; and
a facial comparison unit detecting facial information of one or more of a missing person, a suspect, and a wanted person by comparing facial recognition data recognized by the facial recognition unit with the facial information stored in the second memory unit.

5. The method of claim 4, wherein the autonomous smart car is set to transmit a crime scene image when recognizing a face of one or more of a missing person, a suspect, and a wanted person from images taken by its own black box camera or a separate camera or when receiving a rightful request for the crime scene image.

6. The method of claim 4, further comprising outputting the comparison result from the facial comparison unit through an image output unit of the autonomous smart car, wherein the outputting through the image output unit outputs contact address information of a guardian of a missing person together with matched information when a missing person is matched, and outputs information about police stands and police stations around the autonomous smart car when a suspect is matched.

7. The method of claim 4, further comprising a step in which when the autonomous smart car receives a request for tracing a facial recognition target from a user of the autonomous smart car, the autonomous smart car automatically drives and traces the target and transmits location and image information to the autonomous smart car managing server, the public agency server, and the missing person information server.

* * * * *